(12) United States Patent
Brunneke et al.

(10) Patent No.: US 8,783,993 B2
(45) Date of Patent: Jul. 22, 2014

(54) JOINT AND/OR BEARING ARRANGEMENT

(75) Inventors: Hans-Gerd Brunneke, Georgesmarienhütte (DE); Christian Losche, Stemwede (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 400 days.

(21) Appl. No.: 12/937,645

(22) PCT Filed: Apr. 6, 2009

(86) PCT No.: PCT/DE2009/050017
§ 371 (c)(1),
(2), (4) Date: Oct. 29, 2010

(87) PCT Pub. No.: WO2009/127205
PCT Pub. Date: Oct. 22, 2009

(65) Prior Publication Data
US 2011/0033230 A1 Feb. 10, 2011

(30) Foreign Application Priority Data
Apr. 14, 2008 (DE) .......................... 10 2008 001 157

(51) Int. Cl.
| F16C 11/08 | (2006.01) |
| B60G 7/00 | (2006.01) |
| F16F 1/393 | (2006.01) |
| F16C 11/06 | (2006.01) |
| F16F 1/38 | (2006.01) |

(52) U.S. Cl.
CPC ........ *B60G 7/001* (2013.01); *B60G 2206/8109* (2013.01); *B60G 2206/73* (2013.01); *F16F 1/393* (2013.01); *F16C 11/0614* (2013.01); *B60G 2206/011* (2013.01); *B60G 2204/148* (2013.01); *B60G 2206/124* (2013.01); *B60G 2206/91* (2013.01); *B60G 2204/41* (2013.01); *F16F 1/3842* (2013.01); *B60G 2206/72* (2013.01)
USPC ........ 403/133; 403/122; 403/341; 280/93.51; 280/93.511; 384/206

(58) Field of Classification Search
USPC .......... 384/208, 202, 203, 206, 192; 403/131, 403/133, 132, 122; 280/93.511, 93.51, 280/93.502; 267/279, 280, 281, 282, 283, 267/140.12
See application file for complete search history.

(56) References Cited

U.S. PATENT DOCUMENTS 1,853,727 A * 4/1932 Franks .......................... 384/206
3,007,728 A * 11/1961 Hoffman ....................... 403/132
(Continued)

FOREIGN PATENT DOCUMENTS

| DE | 37 25 102 A1 | 2/1989 |
| DE | 39 21 468 C1 | 5/1990 |

(Continued)

*Primary Examiner* — Daniel P Stodola
*Assistant Examiner* — Matthew R McMahon
(74) *Attorney, Agent, or Firm* — Davis & Bujold, PLLC; Michael J. Bujold

(57) ABSTRACT

A joint and/or bearing arrangement (1) has at least two connecting rods (2, 3), which come together in a receiving region (4), and accommodate a joint (5) or bearing in the receiving region (4), The joint or bearing (5) comprises a joint body (7), which is movably held in a joint body seat (6), and a housing (8) which accommodates and radially externally encloses the joint body seat (6), is designed such that the housing (8) comprises, on the outside, at least one rotation-lock region (9, 10, 14) having a non-circular contour.

13 Claims, 5 Drawing Sheets

(56) References Cited

U.S. PATENT DOCUMENTS

| | | | |
|---|---|---|---|
| 4,227,826 A * | 10/1980 | Conrad | 403/371 |
| 5,028,163 A * | 7/1991 | Krieg et al. | 403/131 |
| 5,286,132 A | 2/1994 | Morini | |
| 5,340,220 A | 8/1994 | Sprang et al. | |
| 5,407,288 A * | 4/1995 | Watanabe | 403/133 |
| 5,538,229 A * | 7/1996 | Kmiec | 267/189 |
| 5,564,521 A * | 10/1996 | McLaughlin et al. | 180/352 |
| 5,967,668 A | 10/1999 | Germano | |
| 5,993,065 A * | 11/1999 | Ladzinski et al. | 384/49 |
| 6,231,264 B1 * | 5/2001 | McLaughlin et al. | 403/76 |
| 6,305,699 B1 * | 10/2001 | Konig | 280/124.133 |
| 6,511,084 B1 | 1/2003 | Buhl et al. | |
| 6,719,476 B2 * | 4/2004 | Hisi | 403/137 |
| 6,733,019 B2 * | 5/2004 | Diener et al. | 280/93.51 |
| 6,959,935 B2 | 11/2005 | Buhl et al. | |
| 7,306,211 B2 * | 12/2007 | Bjorkgard | 267/293 |
| 7,478,802 B2 * | 1/2009 | Wolter et al. | 267/141.2 |
| 7,513,514 B1 * | 4/2009 | Schlosser et al. | 280/93.511 |
| 8,282,305 B2 * | 10/2012 | Rechtien et al. | 403/131 |
| 2010/0013181 A1 * | 1/2010 | Knopp et al. | 280/93.511 |

FOREIGN PATENT DOCUMENTS

| | | |
|---|---|---|
| DE | 40 04 679 A1 | 8/1991 |
| DE | 42 15 195 A1 | 11/1993 |
| DE | 196 34 215 A1 | 2/1998 |
| DE | 199 32 678 A1 | 5/2000 |
| DE | 102 19 708 A1 | 11/2003 |
| DE | 20 2006 000 285 U1 | 5/2006 |
| DE | 10 2006 025 558 A1 | 12/2007 |
| EP | 0 544 112 A1 | 6/1993 |
| WO | 00/51833 A1 | 9/2000 |

* cited by examiner

JOINT AND/OR BEARING ARRANGEMENT

This application is a National Stage completion of PCT/DE2009/050017 filed Apr. 6, 2009, which claims priority from German patent application serial no. 10 2008 001 157.6 filed Apr. 14, 2008.

FIELD OF THE INVENTION

The invention relates to a joint and/or bearing arrangement having at least two connecting rods which come together in a receiving region and a motor vehicle having one or more joint and/or bearing arrangements of that type, in particular in suspension and/or steering parts.

BACKGROUND OF THE INVENTION

It is known to provide so-called A-frame arms for many applications and in particular in suspension and steering regions of motor vehicles, which are designed as a single piece or are composed of two individual connecting rods that extend toward one another in the shape of a "V" and thereby lead into a receiving region, the latter approach being more favorable for actual production. The receiving region can be used to receive a joint or bearing, and can be fastened e.g. to an axle in order to movably secure the axle to a body or a vehicle frame using the A-frame arm.

The merging ends of the connecting rods must be secured to one another, which is accomplished e.g. according to DE 102 19 708 A1 using separate bolts that extend axially through the connecting-rod ends, thereby securing the latter to one another. A solution of this type requires highly complex assembly, however.

In contrast, DE 199 32 678 A1 makes known a solution in which the two connecting-rod ends can be secured to one another using the joint itself, namely the housing thereof. The risk associated therewith is that the joint, when moving during vehicle operation, will work its way into the wall of the receiving region, which is designed as a round eye in this case, thereby resulting in rapid wear of the connection. In addition, it becomes impossible to remove the bearing, e.g. to replace it due to wear, without having to disconnect the connecting rods from one another. Connections of this type are therefore difficult to handle.

DE 42 15 195 A1 shows elastomeric bearings comprising an inner part which has a rotation lock to prevent it from sliding through relative to the elastomer using a form-locked connection in the form of projections disposed on the inner part. The elastomer itself is accommodated in a noncircular housing, and so this form-locked connection forms a further rotation lock.

SUMMARY OF THE INVENTION

The problem addressed by the invention is to achieve an improvement in this case, in particular to simplify assembly and prevent the connecting rods from rotating relative to one another in a simple, effective manner.

In one embodiment, the rotation lock prevents the coupling joint from moving relative to the inner walls of the receiving region, thereby preventing friction-induced wear. The joint and the eyes of the joined connecting rods, which are held together by the joint, do not work against one another and instead are prevented via their connection from being displaced relative to one another.

According to the invention, the radially outward rotation-lock region of the joint and an inner section of the receiving region work together due to a mutually complementary design thereof and a form-locked meshing of the aforementioned parts.

Flat portions, which deviate from a round contour and are easy to manufacture, can be provided for this purpose.

By means of another embodiment, the merging ends of the connecting rods can be secured to one another without the use of further retention means such as bolts, thereby simplifying assembly and reducing material usage; in addition, a joint or bearing that is held in the receiving region can be removed since the sleeve body is separate, without having to disconnect the connecting rods from one another.

A particular advantage of the invention is that various sleeve bodies can be provided with different wall thicknesses, thereby making it possible e.g. to adapt similar joints to differently sized receiving regions of connecting-rod ends. The joint itself, which comprises a journal, a joint body seat and a housing enclosing the latter entirely or partially, can remain entirely unchanged, thereby enabling it to be prefabricated cost-effectively in large quantities.

To ensure a secure hold, the connecting-rod ends facing the receiving region are held, according to the invention, in the press fit on the sleeve body, and therefore the sleeve body forms a stationary shell for insertion of the joint. In particular, a rotation lock is provided in this case as well by providing the sleeve body with an outer contour for non-rotatably holding the connecting-rod ends, approximately in a manner such that the sleeve body and the receiving regions each have noncircular flat portions.

It is also possible to reverse the fit by varying the inner diameter of the sleeve body, thereby making it possible to insert different joints or bearings for adaptation to receiving units of connecting-rod ends.

Furthermore, it is favorable for the sleeve body to include, on the axial outer sides thereof, retaining elements which enclose the connecting-rod ends on the outside, at least in sections, and prevent axial motion thereof. The rotation lock is achieved as a result, and the sleeve body and the joint or bearing held therein are well-secured axially.

To ensure an exact axial fit, at least one of the retaining elements can be designed e.g. as a rolled edge after the sleeve is inserted into the connecting-rod ends, by reshaping the sleeve body. A separate locking element such as a snap ring can then be omitted.

Furthermore, the sleeve body can include, on one axial end, a radially inwardly pointing stop for a joint or bearing that can be inserted into the sleeve body, thereby easily ensuring the correct axial orientation thereof. A locking mechanism such as a snap ring can be provided on the side opposite the stop, to hold the joint or bearing cartridge in the sleeve body in an axially non-displaceable manner. To disassemble the joint or bearing, the only step that is required is to release this locking mechanism. The joint or bearing can then be withdrawn, without the use of force, axially from the sleeve body.

To ensure cost-effective assembly, a particular sleeve body including the joint or bearing held therein can be designed in entirety as a prefabricated component.

A motor vehicle having at least one joint and/or bearing arrangement according to the invention, in particular inside suspension and/or steering parts, e.g. also as axle support for trucks, is claimed separately.

BRIEF DESCRIPTION OF THE DRAWINGS

Further advantages and features of the invention result from the embodiments of the subject matter of the invention, which are depicted in the drawings and described in the following.

In the drawings.

DETAILED DESCRIPTION OF THE PREFERRED EMBODIMENTS

Figure 1:
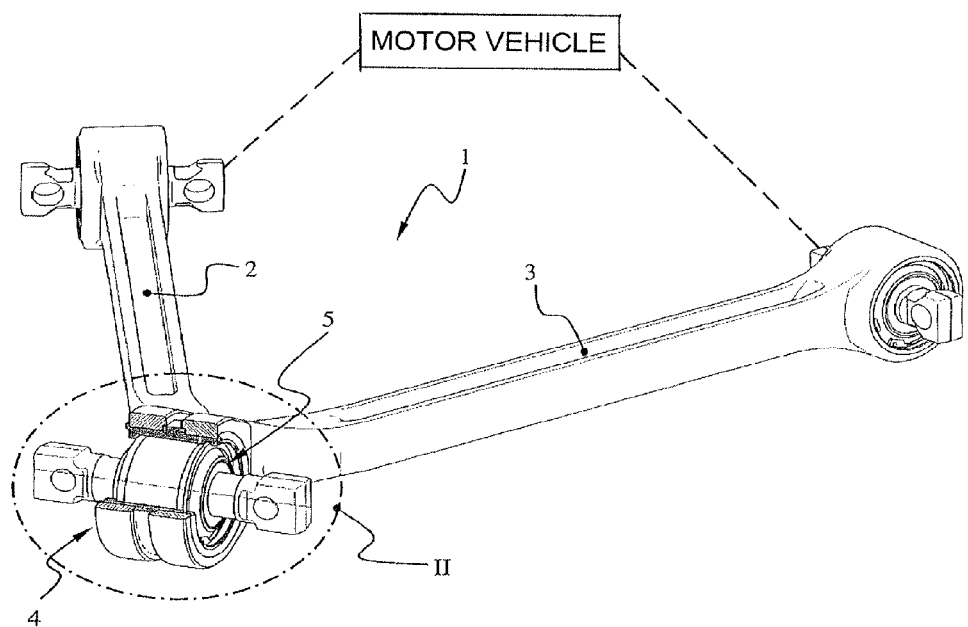
FIG. 1 shows a perspective view of an arrangement, according to the invention, of two connecting rods which are held together in a receiving region using a joint inserted there.

The joint unit 1, which is depicted in entirety in FIG. 1, comprises two connecting rods 2, 3 which extend toward one another to form an acute angle, in an A-frame arm arrangement; they are straight in this case, although this is not necessary. They lead into a receiving unit 4 at the tip of the triangle, which comprises an eye for receiving a continuous joint 5. They can likewise be movably supported, e.g. on a chassis or a support frame, at their back ends using joints.

The joint 5 (a bearing would also be possible) comprises a joint body 7 which is movably held in a joint body seat 6 and is expanded spherically in this case in the axially central region thereof. The joint body seat 6 can be formed by an elastomer, e.g. rubber, that can move together with the joint body 7, via elastic deformation, when connected accordingly between the parts. A frictional relative motion between the joint body 7 and the joint body seat 6, which acts as embedding, is then not required. A housing 8 that accommodates and radially outwardly encloses the joint body seat 6 is also provided. The housing 8 is composed e.g. of metal. Stop rings 20 are provided for securing the joint body seat 6, which are disposed axially on the outside and abut the housing 8, and via which an axial preload can also be introduced into the joint body seat 6.

The two connecting rods 2, 3, in the installed position thereof (FIG. 1), are securely connected to one another using the joint 5 without any further connection such as a through-bolt or the like.

Figure 2:
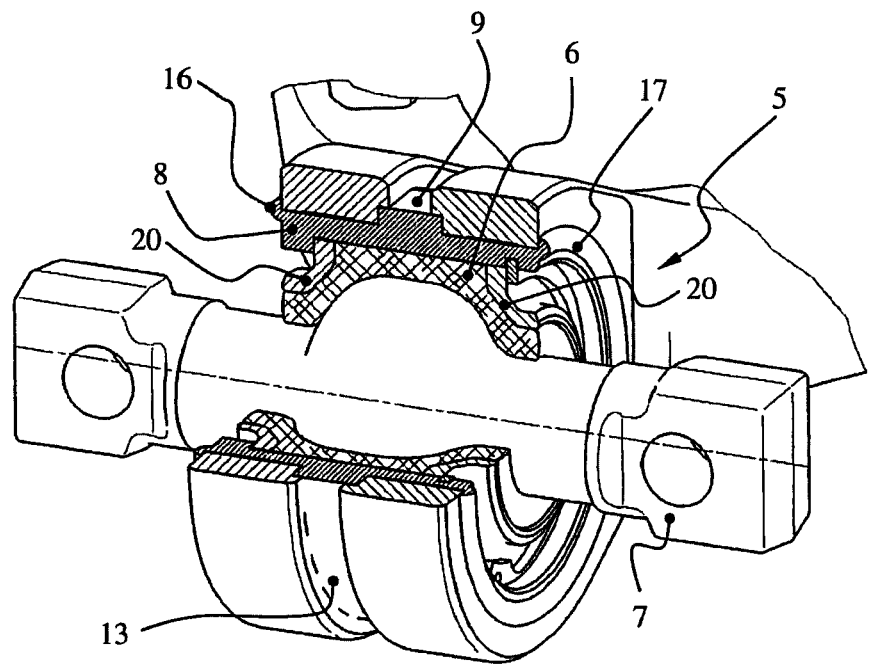
FIG. 2 shows a detailed view that approximately corresponds to section II shown in FIG. 1.
Figure 3:
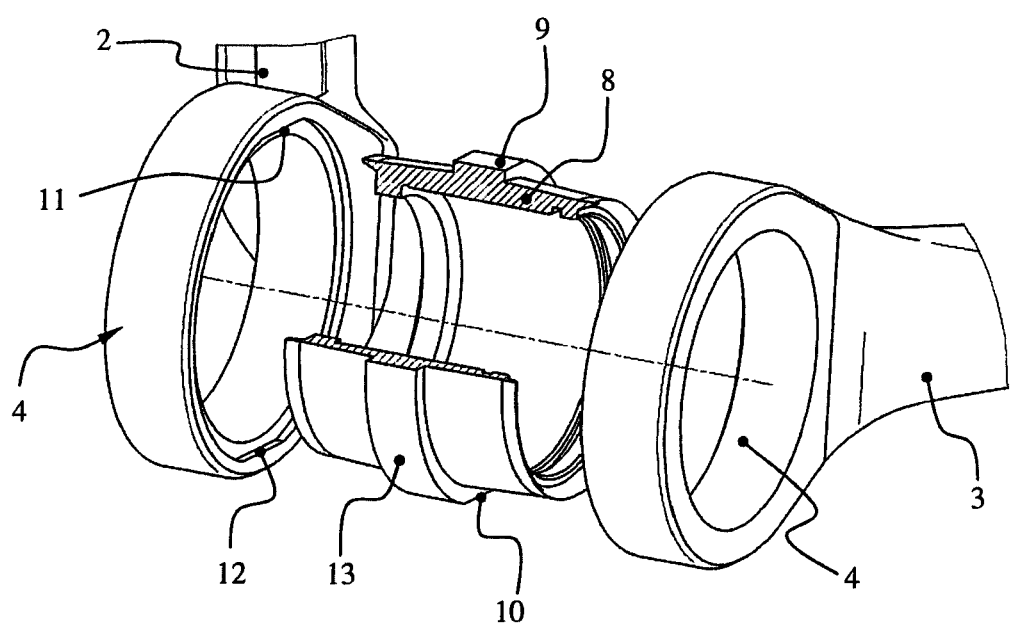
FIG. 3 shows an exploded view of the two front connecting-rod ends and the radially outer wall of the joint depicted in FIG. 2, in a non-assembled position.

In the first embodiment as depicted in FIGS. 1 through 3, this is made possible in that the housing 8, in the installed position, simultaneously extends through both receiving regions 4 of the connecting rods 2, 3, thereby holding them against one another.

For this purpose, the housing 8 includes, on the outside thereof, at least one rotation-lock region 9 having a noncircular contour. In the present example, two rotation-lock regions 9, 10 are provided at the top and the bottom, both of which are designed as flat portions of the outer contour of the housing 8. The shape of the receiving regions 4 of the connecting rods 2, 3 is matched thereto and likewise include upper and lower flat portions 11, 12 which interact in a form-locked manner with the rotation-lock regions 9, 10 of the housing 8. In this case, the flat portions 11, 12 are formed only axially inwardly on the receiving regions 4, thus giving each of them a round outer contour.

As shown e.g. in FIGS. 2 and 3, the housing 8 has a circumferential central segment 13 on which the rotation locks 9, 10 are disposed, diametrically opposed to one another. In the engaged position (FIG. 2), it separates the two connecting rods 2, 3 by an axial distance to prevent direct contact between the two, thereby preventing wear of the connecting rods 2, 3 which could result from their rubbing against one another. The connecting rods 2, 3 are likewise prevented from rubbing against the central segment by rotation locks 9, 10.

Figure 4:
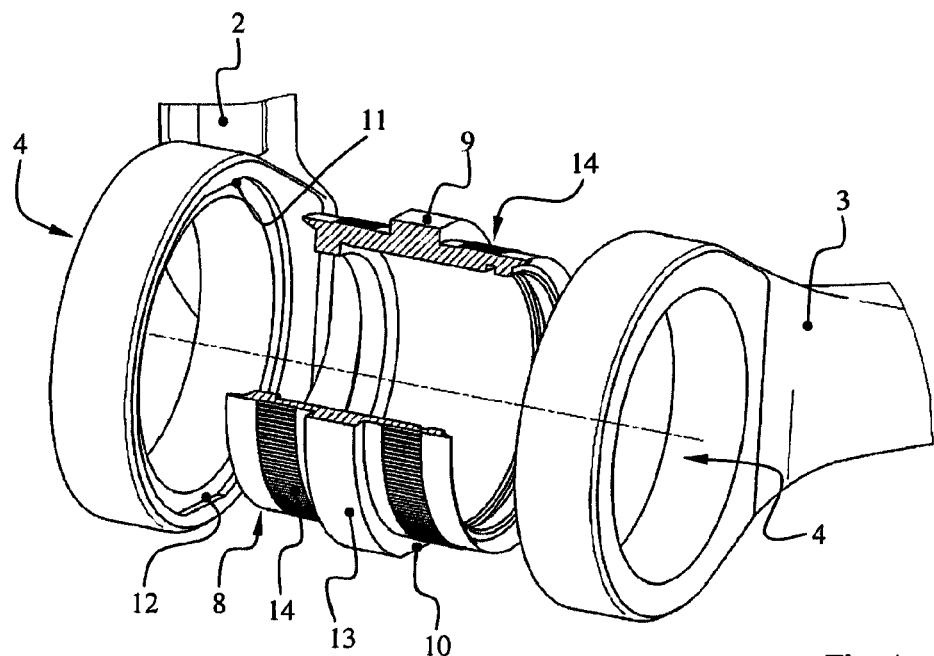
FIG. 4 shows a view similar to that depicted in FIG. 3 of an alternative embodiment of the outer edge of the housing, including an additionally applied knurl as part of a rotation lock.

An alternative version is depicted in FIG. 4, in the case of which a knurl 14 on the outer side of the housing 8 is also provided as a further rotation lock. This, in combination with the spacer 13 and the rotation locks 9, 10 in particular, very reliably ensures that the parts 5, 2, 3 will not move against one another.

Figure 8:
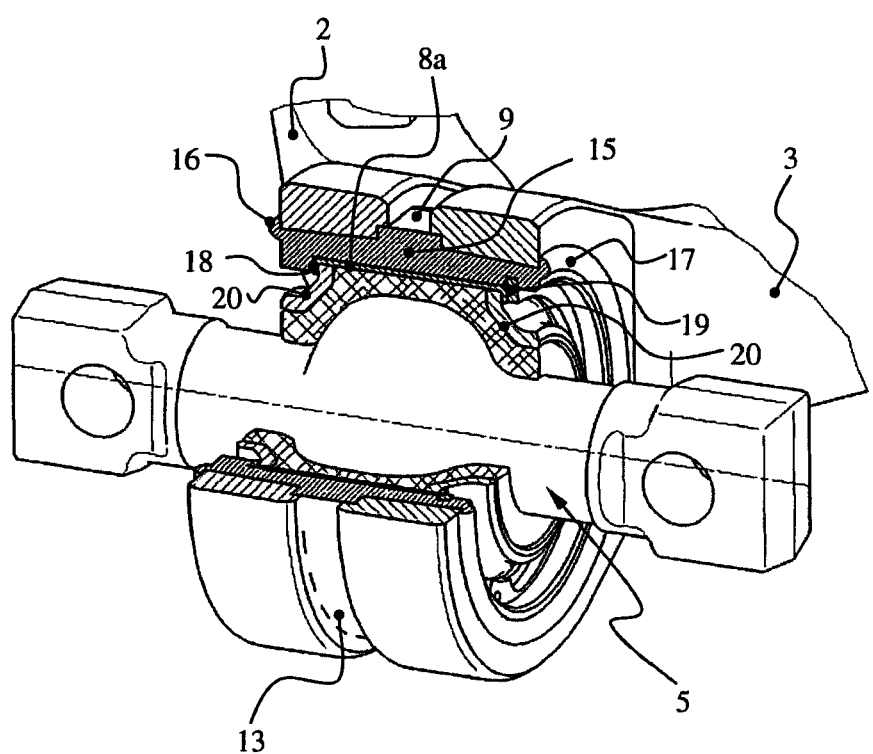
FIG. 8 shows a view similar to that depicted in FIG. 2 however the joint and the housing thereof are replaceably accommodated entirely by a sleeve body which connects the receiving regions of the connecting rods.

FIG. 8 shows an embodiment of the invention in which the joint 5 and the outer housing wall 8a thereof are accommodated inside a sleeve body 15 that simultaneously holds the connecting rods 2, 3 together in their receiving regions 4.

The entire joint 5 can thereby be withdrawn axially out of the sleeve body 15—e.g. for maintenance or to be replaced—while ensuring that the ends of the connecting rods 2, 3 will remain securely held against one another. To achieve this, the sleeve body 15 is disposed outside of the actual housing wall 8a which, in this case, is formed separately, in contrast to the first embodiment.

Otherwise, this sleeve body 15 corresponds to the housing 8 in the first embodiment according to FIGS. 1 to 3 and 4.

In this case as well, the ends of the connecting rods 2, 3 facing the receiving region 4 are held in the press fit on the sleeve body 15; the sleeve body 15 is likewise provided with an outer contour 9, 10 to non-rotatably hold the connecting-rod ends, which can be embodied as flat portions 9, 10 on a spacer 13 in this example just as in FIGS. 1 through 3. A knurl 14 or outwardly extending crimping, ribs, or the like is also possible.

The sleeve body 15 in this case, and the housing 8 in the first embodiment, is likewise provided with retaining elements on the axial outer sides thereof, which enclose the connecting-rod ends on the outside, at least in sections, and prevent axial motion thereof, in this case by means of rolled edges 16, 17 which are formed by reshaping after the part 15 or 8 is inserted into the receiving regions of the connecting-rod ends (transition from FIG. 3 to FIG. 2).

The sleeve body 15 of the first embodiment according to FIG. 8, or the housing wall 8 of the first embodiment, is formed of steel in particular, and has a wall thickness of at least three millimeters to ensure the desired high stability of the axial hold of the connecting rods 2, 3 against one another, and to ensure that they do not rotate relative to one another about the joint axis 7.

By means of the invention, it is also possible, in particular, to provide a selection of sleeve bodies 15 or housings 8 having different wall thicknesses, thereby ensuring that joints 5 that are similar per se can be pressed into receiving regions 4 of different diameters. High flexibility is achieved as a result, and the potential for savings is great in particular due to the use of identical joints 5 in each case even though the diameter of the eyes 4 differs.

Furthermore, FIG. 8 shows that the sleeve body 15 includes, on one axial end, a radially inwardly pointing stop 18 for the joint 5 or bearing which can be inserted into the sleeve body 15. A groove or a similar seat for a locking mechanism, in particular a snap ring 19, which secures the inserted bearing or joint 5 can e.g. be provided on the end that is situated axially opposite the stop 18.

Once it has been loosened, the entire joint 5 or bearing can be withdrawn axially out of the sleeve body 15 which can remain in the press fit thereof to hold the connecting rods 2, 3 against one another.

In terms of production engineering, it is particularly advantageous for series production when the sleeve body 15 and the joint 5 or bearing held therein form a prefabricated component which can then be inserted in the manner of a cartridge.

Figure 7:
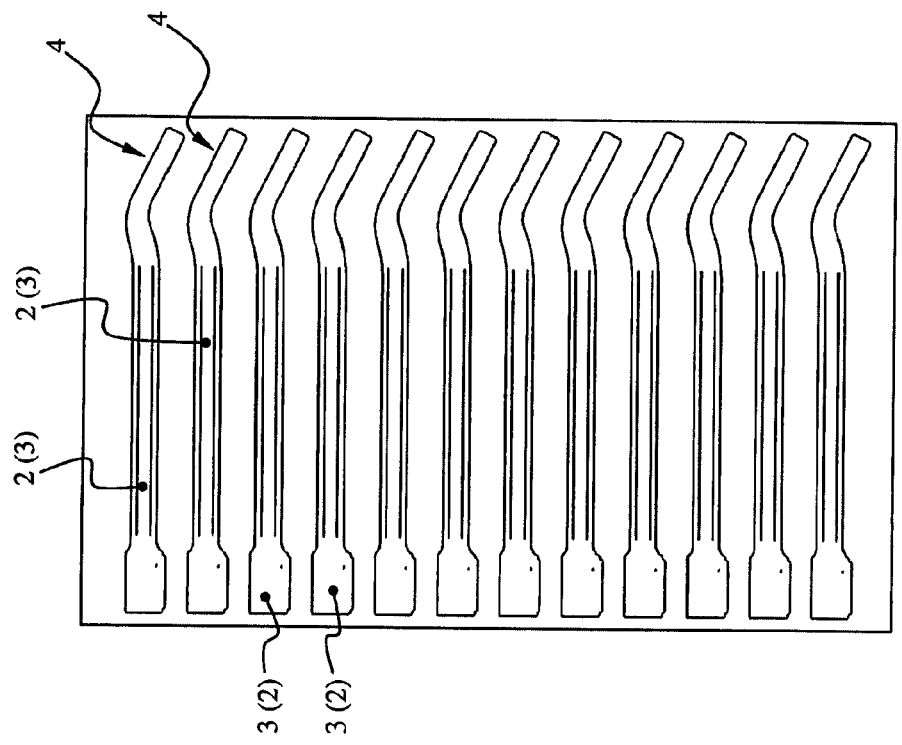
FIG. 7 shows a similar view of the same production unit as in FIG. 6, although now for the manufacture of individual connecting rods that will be joined subsequently.
Figure 6:
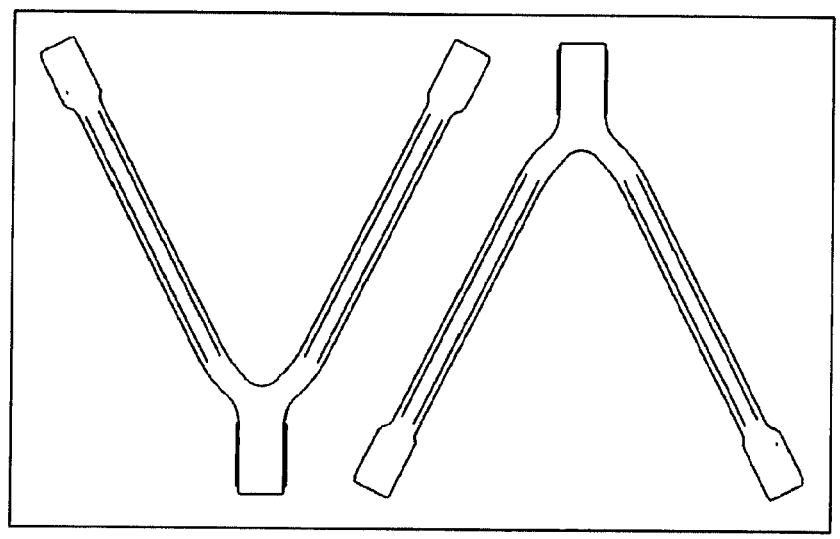
FIG. 6 shows a schematic top view of a production unit for cast, continuous A-frame arms.

FIGS. 6 and 7 show, for comparison purposes, how the effectiveness of manufacturing connecting rods in the form of A-frame arms that extend toward each other to form an acute angle can be increased by using individual connecting rods 2, 3 (FIG. 7) instead of one continuous connecting rod (FIG. 6) by making better use of surface area.

In particular, the connecting rods 2, 3 can also be fully identical in design. This would eliminate the need to differentiate between different connecting rods during assembly. In the assembled state, the connecting rods 2, 3 extend toward one another, forming an acute angle (FIG. 1). Angles of opening of 40 to 60 degrees are common in practical applications.

Joint and/or bearing units 1 of that type, as depicted in FIG. 1, can be disposed e.g. longitudinally in the vehicle to support an axle, in particularly in a truck. The joint 5 in the seat 4 therefore extends transversely to the vehicle and can movably hold the axle.

Figure 5:
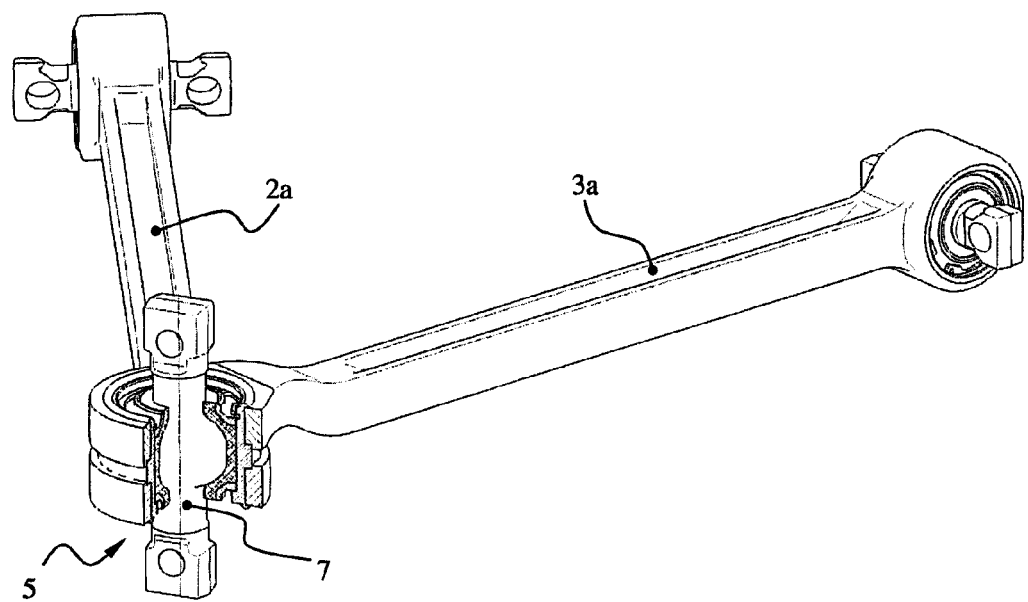
FIG. 5 shows a view similar to that depicted in FIG. 1, although in an alternative geometry having a perpendicular joint axis.

Other arrangements, in suspension and/or steering parts in particular, are also possible. It is possible, for example (see FIG. 5), to stack the receiving regions vertically to facilitate assembly of a joint 5 having a perpendicular axis.

LIST OF REFERENCE CHARACTERS

1 Joint or bearing arrangement
2 Connecting rod
3 Connecting rod
4 Receiving region
5 Joint
6 Joint body seat
7 Joint body
8 Housing
8a Housing
9 Rotation lock (flat portions)
10 Rotation lock (flat portions)
11 Adapted region of the connecting-rod end
12 Adapted region of the connecting-rod end
13 Spacer
14 Knurl
15 Sleeve body
16 Rolled edge
17 Rolled edge
18 Stop
19 Snap ring
20 Stop rings

The invention claimed is:

1. An arrangement (1) comprising at least two connecting rods (2,3), each of the connecting rods having a receiving region (4), which together accommodate a joint or bearing (5) therein,
the joint or bearing (5) comprising a joint body (7) that is supported by a joint body seat (6) along an axis, and a rod portion of each of the two connecting rods extending away from the axis,
a housing (8) accommodating and radially enclosing the joint body seat (6),
the housing (8) comprising an exterior surface which engages the receiving region of each of the connecting rods, a central segment projects radially from the exterior surface of the housing, a perimeter of the central segment comprises at least one rotation-lock region (9, 10, 14) having a noncircular contour,
the receiving region (4) of each of the connecting rods (2, 3) being shaped to match (11, 12) the rotation-lock region (9; 10; 14) of the housing (8) such that the perimeter of the central segment mates with the receiving regions of the connecting rods, the central segment is axially located between the receiving regions (4) of the connecting rods (2, 3) and axially spaces the receiving regions of the connecting rods from each other, and
the rotation-lock region (9; 10) of the housing engaging with the receiving region (4) of each of the connecting rods (2, 3) in a form-locked manner to prevent any relative rotation between the housing and the connecting rods around the axis,
wherein the rotation-lock region (9, 10) includes a flat portion of an otherwise circular contour of the housing (8).

2. The arrangement (1) according to claim 1, wherein the connecting rods (2, 3) form an A-frame arm when connected together in the receiving regions (4).

3. An arrangement (1) comprising at least two connecting rods (2, 3), each of the connecting rods having a receiving region (4), which together accommodate a joint or bearing (5) therein, the joint or bearing (5) comprises a joint body (7) that is movably supported in a joint body seat (6) along an axis, and a rod portion of each of the two connecting rods extending away from the axis,
a housing wall (8a) accommodating and radially enclosing the joint body seat (6),
a sleeve body having a radially interior surface which abuts the housing wall and a radially exterior surface which abuts the receiving regions of the connecting rods such that the joint or bearing (5) is supported by the sleeve body (15), the radially exterior surface of the sleeve body comprises a central segment that extends radially outward therefrom, the receiving regions of the connecting rods are axially spaced from one another by the central segment that extends into an axial space formed between the connecting rods (2, 3), opposite axial ends of the sleeve body have edges which abut axially outer surfaces of the connecting rods (2, 3) and maintain contact between the connecting rods and the central segment of the sleeve body, the sleeve body being press fit into the receiving regions of the connecting rods, and the connecting rods (2, 3) being non-rotatably held, via a contour (9; 10; 14) provided on the exterior surface of the sleeve body (15), so as to prevent any relative rotation between the connecting rods (2, 3) with respect to one another and around the axis,
wherein the contour includes a flat portion of an otherwise circular contour of the exterior surface of the sleeve body.

4. The arrangement (1) according to claim 3, wherein the edges on the opposite axial ends of the sleeve body are retaining elements (16; 17) which enclose the connecting-rod ends on the outside, at least in sections, and prevent axial motion thereof.

5. The arrangement (1) according to claim 4, wherein at least one of the retaining elements (16; 17) is formed by reshaping the sleeve body, after the sleeve body (15) is inserted into the connecting- rod ends.

6. The arrangement (1) according to claim 5, wherein at least one of the retaining elements (16; 17) is a rolled edge.

7. The arrangement (1) according to claim 3, wherein the sleeve body (15) comprises steel and has a wall thickness of at least three millimeters.

8. The arrangement (1) according to claim 3, wherein the arrangement (1) comprises a selection of sleeve bodies (15) having different wall thicknesses.

9. The arrangement (1) according to claim 3, wherein a radially inwardly pointing stop (18) for the joint or bearing (5) is supported on one axial end of the sleeve body.

10. The arrangement (1) according to claim 9, wherein the sleeve body (15) includes a snap ring (19) and, on an axial end thereof that is situated axially opposite the stop (18), one of a groove and a seat for receiving the snap ring (19).

11. The arrangement (1) according to claim 10, wherein the snap ring (19) is received within the one of the groove and the seat for axially fixing the joint or bearing (5) within the sleeve body (15).

12. The arrangement (1) according to claim 3, wherein the sleeve body (15) forms, with the joint or bearing (5) held therein, a prefabricated component.

13. A motor vehicle comprising at least one of inside suspension and steering parts which comprise either a joint or bearing arrangement (1) having at least two independent connecting rods (2, 3), each of which comprises a receiving region (4) that together accommodate either a joint (5) or bearing in the receiving regions (4) thereof, the joint or bearing (5) comprises a joint body (7) that is directly supported along an axis by a radially interior surface of a joint body seat (6), and a rod portion of each of the two connecting rods each extending away from the axis, a radial interior of a housing (8) directly supports and radially encloses the joint body seat (6), a radially exterior surface of the housing (8) comprises a spacer that extends radially outward from the exterior surface of the housing, the spacer is centrally located between opposite axial ends of the exterior surface of the housing, the connecting rods are supported on the exterior surface of the housing with the spacer radially extending therefrom axially between the connecting rods such that the receiving regions of the connecting rods are axially spaced from one another, the spacer has a circumference with a noncircular contour that forms a rotation-lock region, and the receiving region (4) of the connecting rods (2, 3) comprises a cavity with a contour that is shaped to match (11,12) the rotation-lock region (9, 10, 14) of the housing (8), and the rotation-lock region (9, 10) of the housing engages the receiving region (4) of the connecting rods (2; 3) in a form-locked manner to rotationally fix the housing to the connecting rods and prevent any relative rotation between the connecting rods (2, 3) with respect to one another and around the axis, wherein the rotation-lock region (9, 10) includes a flat portion of an otherwise circular contour of the spacer.

* * * * *